(No Model.)

E. E. PARK.
DENTAL DISK HOLDER.

No. 471,887. Patented Mar. 29, 1892.

Witnesses,

Inventor,
Edward E. Park.
By Dewey & Co.
Attys

UNITED STATES PATENT OFFICE.

EDWARD E. PARK, OF SAN FRANCISCO, CALIFORNIA.

DENTAL-DISK HOLDER.

SPECIFICATION forming part of Letters Patent No. 471,887, dated March 29, 1892.

Application filed July 1, 1891. Serial No. 398,172. (No model.)

*To all whom it may concern:*

Be it known that I, EDWARD E. PARK, a citizen of the United States, residing in the city and county of San Francisco, State of California, have invented an Improvement in Mandrels for Dental Engines and Lathes; and I hereby declare the following to be a full, clear, and exact description of the same.

My invention relates to a mandrel which is especially applicable for use upon dental engines and lathes.

It consists of a sleeve having an enlarged roughened head or flange, a stem adapted to pass through said sleeve, said stem having a head upon it with its inner face correspondingly roughened, so that polishing or grinding disks may be held between the two roughened faces, and in connection with these of a mandrel adapted to pass through the handpiece of the dental instrument, and having a screw-threaded hole in the end, into which the inner end of the pin is screwed, so as to compress and bind the polishing-plate between the head of the sleeve and that of the pin.

Figure 1:
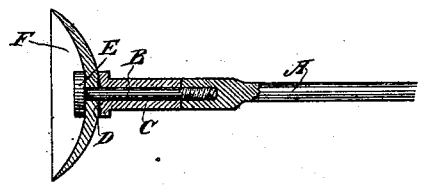
Figure 2:
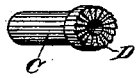
Figure 3:
Figure 4:

Referring to the accompanying drawings for a more complete explanation of my invention, Figure 1 is an enlarged sectional view of my device. Figs. 2, 3, and 4 are enlarged views of the different parts of my device.

A is a shaft or mandrel, such as is used for dental tools. These mandrels have a means (not here shown) by which they are attached to the driving-shaft, and usually have the particular tool formed in the same piece upon the outer end. In the present case I have shown the end of the part A having a hole made in it and screw-threaded to receive the correspondingly-threaded end of the pin B.

C is a sleeve having a hole through its center, of sufficient diameter to allow the pin B to pass through it. This sleeve has upon it a head D, the end face of which is corrugated or roughened, as shown. The pin B has also a head E, made upon its outer end, having approximately the same diameter as the head D, and the inner face of this head is correspondingly roughened, toothed, or corrugated, as shown in Fig. 3.

F is a disk of any suitable shape or construction. It may be rigid or flexible and soft, and is used for grinding, cutting, or polishing, as the case may be. It may be either flat or concave, and has a hole made through its center of sufficient size to admit the shank of the pin B. This pin is passed through the hole in the disk and thence passes through the sleeve C, and is screwed into the end of a mandrel A. The screw-threads act to force the faces of the heads D and E against the opposite sides of the disk, thus clamping it firmly between the two and retaining it so that it will be driven by the rotation of the mandrel, the corrugations holding it and preventing it from slipping or moving from its place.

Whenever it is desired to renew the disk or change it for another one, it is only necessary to unscrew the pin from the mandrel, remove the sleeve from the pin, and slip the disk off, when it may be replaced by another and the parts put together ready for work again. By this construction a single mandrel may be employed for a great variety and number of different disks, and the expense is considerably lessened, as the mandrel does not have to be sacrificed when the disk is worn out or useless.

Having thus described my invention, what I claim as new, and desire to secure by Letters Patent, is—

A mandrel for dental engines or lathes, consisting of the shank A, a sleeve C, extending in line with one end of the shank, having a head with corrugations upon the outer end, a pin fitting the hole in the sleeve and screw-threaded to enter corresponding threads in the end of the shank A, a head upon the pin, having the inner face adjacent to the head of the sleeve correspondingly corrugated, whereby the disk may be clamped between the corrugated faces and prevented from slipping, substantially as herein described.

In witness whereof I have hereunto set my hand.

EDWARD E. PARK.

Witnesses:
O. B. MARTIN,
H. J. LANG.